(12) United States Patent
Takeuchi (10) Patent No.: US 7,211,812 B2
(45) Date of Patent: May 1, 2007

(54) ENTANGLED PHOTON PAIR GENERATING APPARATUS

(75) Inventor: Shigeki Takeuchi, Sapporo (JP)

(73) Assignee: Japan Science and Technology Agency (JP)

( * ) Notice: Subject to any disclaimer, the term of this patent is extended or adjusted under 35 U.S.C. 154(b) by 459 days.

(21) Appl. No.: 10/502,773

(22) PCT Filed: Jan. 28, 2003

(86) PCT No.: PCT/JP03/00762

§ 371 (c)(1),
(2), (4) Date: Jul. 26, 2004

(87) PCT Pub. No.: WO03/065117

PCT Pub. Date: Aug. 7, 2003

(65) Prior Publication Data

US 2005/0094142 A1    May 5, 2005

(30) Foreign Application Priority Data

Feb. 1, 2002 (JP) .............................. 2002-026085

(51) Int. Cl.
*G01J 4/00* (2006.01)

(52) U.S. Cl. ................. 250/493.1; 250/458.1; 250/225; 250/216; 372/21; 356/364; 380/256; 380/277

(58) Field of Classification Search ............ None
See application file for complete search history.

(56) References Cited

U.S. PATENT DOCUMENTS 6,897,434 B1 * 5/2005 Kumar et al. .......... 250/227.18

FOREIGN PATENT DOCUMENTS

| JP | 11-183950 | 7/1999 |
|----|-----------|--------|
| WO | WO 99/32933 | 7/1999 |

OTHER PUBLICATIONS

Paul G. Kwiat et al., Dec. 11, 1995, New High-Intensity Source of Polarization-Entangled Photon Pairs, *Physical Review Letters*, vol. 75, No. 24.
Paul G. Kwiat et al., Aug. 1999, Ultrabright source of polarization-entangled photons, *Physical Review A*, vol. 60, No. 2.
T. B. Pittman et al., Apr. 1996, Two-photon geometric optics, *Physical Review A*, vol. 53, No. 4.
Lei Zhang et al., Experimental and Theoretical Aspects of Quantum Teleportation, *Center for Engineering Science Advanced Research*.

* cited by examiner

*Primary Examiner*—Nikita Wells
*Assistant Examiner*—Zia R. Hashmi
(74) *Attorney, Agent, or Firm*—McGlew & Tuttle, PC

(57) ABSTRACT

An entangled photon pair generating apparatus has a first definite polarization photon pair generating apparatus for generating a first definite polarization photon pair beam according to an incident pump beam, a wave plate for rotating by 90 degrees a plane of polarization of the first definite polarization photon pair beam emitted from the first definite polarization photon pair generating apparatus, and a second definite polarization photon pair generating apparatus for generating a second definite polarization photon pair beam according to the incident pump beam. They are adjacently placed in order along an optical axis of the incident pump beam.

13 Claims, 13 Drawing Sheets

ENTANGLED PHOTON PAIR GENERATING APPARATUS

TECHNICAL FIELD

This invention relates to an entangled photon pair generating apparatus, and more particularly to the entangled photon pair generating apparatus capable of efficiently generating two photon beams containing a photon pair in which photons making the pair are generated simultaneously and there is a correlation (entanglement) in a quantum state of each photon. Such an entangled photon pair can be variously used in a quantum cryptographic communications system, a quantum computation system, an analysis system or a like system using light.

BACKGROUND ART

In recent years, attention is paid to researches which essentially use a nature of quantum mechanics to realize unprecedented functions of information communication and information processing. For instance, there are pointed-out possibilities that quantum cryptographic communication may realize perfect confidentiality from an eavesdropper based on the uncertainty principle, and quantum computation may perform in a few hours a calculation which requires an astronomical time with an existing computer. An "entangled photon pair source" is an indispensable technology component for realization of those applications. For instance, while distance limitation in quantum cryptography is 100 km or so, there is a proposal of a repeater containing the "entangled photon pair source" as a method for breaking through the limitation. On the other hand, it is theoretically indicated that the quantum computation using photons can be performed by combining the "entangled photon pair source" with existing optical devices and photon detector. Parametric downconversion has been mainly used as the entangled photon pair source so far. As for this method, however, photon pairs are extensively generated in a very wide range. Therefore, only a part of the generated ones can be used, and coupling to a fiber is also very difficult.

As for the entangled photon pair source, the two methods disclosed by P. Kwiat et al. in 1995 (reference #1 and in 1999 (reference #2) have been used so far. However, the photon pairs generated from these photon pair sources are extensively radiated in a wide solid angle so that their yield is low. While experimental researches in quantum information are becoming popular recently, the researches in generation of the entangled photon pair have hardly been made so far.

The reference #1 is "P. G. Kwiat, K. Mattle, H. Weinfurter, A. Zeilinger, A. V. Sergienko, and Y. Shih, Phys. Rev. Lett. 75, 4337 (1995)." The reference #2 is "P. G. Kwiat, E. Waks, A. G. White, I. Appelbaum, and P. H. Eberhard, Phys. Rev. A 60, R773 (1999)."

It is an object of the present invention to realize an entangled photon pair generating apparatus capable of efficiently generating a photon pair in an entangled state by converging them in beam shape.

DISCLOSURE OF THE INVENTION

The entangled photon pair generating apparatus of the present invention can have the following structure.

An entangled photon pair generating apparatus of the present invention comprises: a first definite polarization photon pair generating apparatus to generate a first definite polarization photon pair beam according to an incident pump beam; a wave plate to rotate by 90 degrees a plane of polarization of the first definite polarization photon pair beam emitted from the first definite polarization photon pair generating apparatus; and a second definite polarization photon pair generating apparatus to generate a second definite polarization photon pair beam according to the incident pump beam, wherein the first definite polarization photon pair generating apparatus, wave plate and second definite polarization photon pair generating apparatus are adjacently placed in the order along an optical axis of the incident pump beam.

It is preferable that, in the entangled photon pair generating apparatus of the present invention, the first and second definite polarization photon pair generating apparatuses are nonlinear optical devices.

It is also preferable that, in the entangled photon pair generating apparatus of the present invention, an incident angle of the incident pump beam on the nonlinear optical devices is an angle at which the angle made by the optical axis of a crystal in the nonlinear optical device and the incident pump beam satisfies a collinear condition.

It is also preferable that, in the entangled photon pair generating apparatus of the present invention, the nonlinear optical device is a BBO (β-Ba B$_2$ O$_4$) crystal.

It is also preferable that the entangled photon pair generating apparatus of the present invention further comprises a lens to focus each of entangled photon pair beams; and an optical fiber to couple the focused beams.

It is also preferable that, as to the entangled photon pair generating apparatus of the present invention, the first and second definite polarization photon pair generating apparatuses further comprise an incident pump beam generating unit; and a photon pair generating unit comprising the nonlinear optical device having the angle made by the optical axis of the crystal and the incident pump beam set up at the angle for a tuning curve thereof to contact with a specific single wavelength a, wherein two photon beams are generated which include a pair of photons of the wavelength a which are generated simultaneously.

It is also preferable that, in the entangled photon pair generating apparatus of the present invention, the first and second definite polarization photon pair generating apparatuses comprise the incident pump beam generating unit; and the photon pair generating unit comprising the nonlinear optical device having the angle made by the optical axis of the crystal and the incident pump beam set up at the angle for the tuning curve thereof to contact with wavelengths a and b, respectively, wherein the two photon beams are generated which are include a pair of photons of the wavelengths a and b which are generated simultaneously.

It is also preferable that the entangled photon pair generating apparatus of the present invention comprises a detecting unit for detecting one of the generated photon pair, wherein the detecting unit is able to identify generation time of each individual photon included in the beam.

BEST MODE FOR CARRYING OUT THE INVENTION

I have successfully developed a technology for generating a photon pair of beam shape in an "unentangled" state in which one is fixed in vertical polarization and the other in horizontal polarization (reference #3). Such an unentangled photon pair beam having its plane of polarization fixed is called a "definite polarization photon pair beam" and a generating apparatus thereof is called a "definite polarization photon pair generating apparatus" in this specification. The reference #3 is Japanese Patent Laid-Open No. 11-183950.

An entangled photon pair generating apparatus according to the present invention has a structure in which two such definite polarization photon pair generating apparatuses are placed in series so as to insert a half-wave plate for rotating the polarization by 90 degrees between the two apparatuses. The two definite polarization photon pair generating apparatuses are comprised of very transparent nonlinear optical devices such as BBO, and the half-wave plate is also very transparent. Because of this structure, the definite polarization photon pair beam generated from the first definite polarization photon pair generating apparatus is outputted with its plane of polarization rotated by 90 degrees by the half-wave plate, and is superposed on the definite polarization photon pair beam generated from the second definite polarization photon pair generating apparatus. Thus, overlapping of a quantum state occurs between two orthogonal polarization photon pairs so that it is possible to obtain an entangled photon pair beam having a correlation between the photon pairs.

Figure 1A:
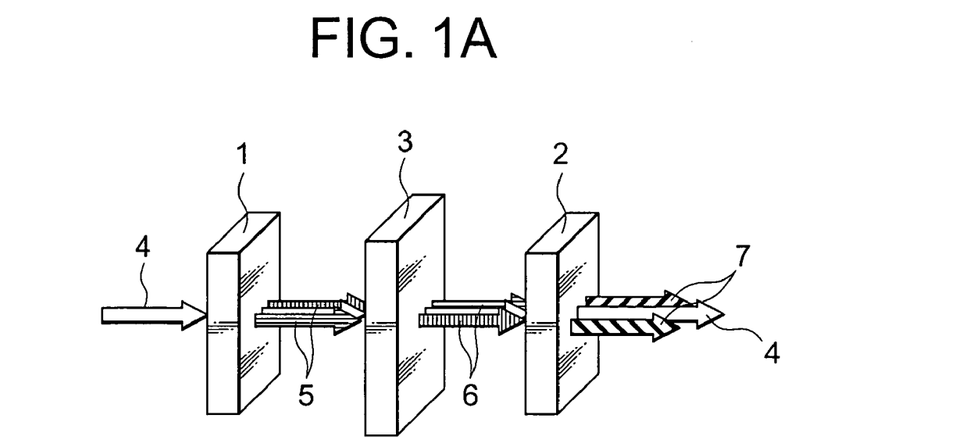
FIGS. 1A and 1B are diagrams for explaining a principle of the present invention.
Figure 1B:
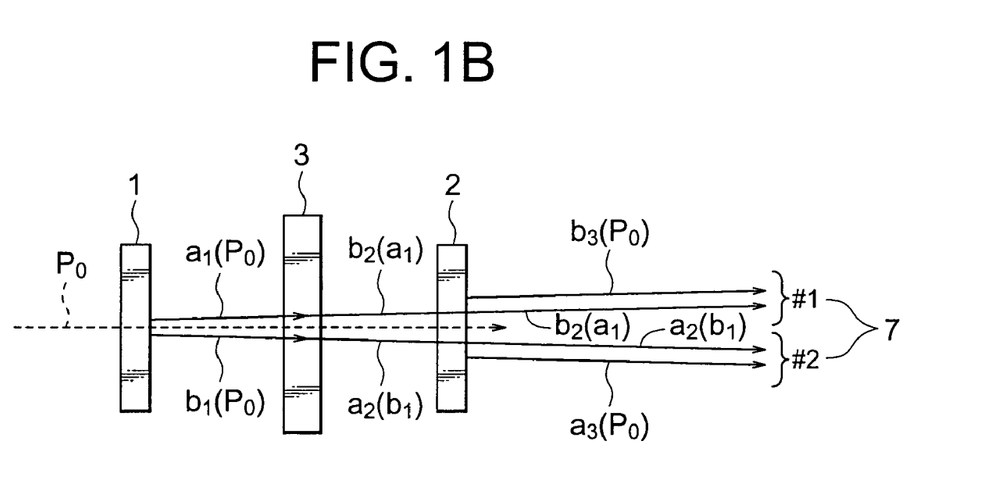

FIGS. 1A and 1B are diagrams for explaining a principle of an entangled photon pair generating apparatus according to the present invention. FIG. 1A is a conceptual diagram of the apparatus, and 1B is a diagram for explaining a polarization state. In FIGS. 1A and 1B, reference numeral 1 denotes the first definite polarization photon pair generating apparatus, 2 denotes the second definite polarization photon pair generating apparatus, 3 denotes the half-wave plate, 4 denotes incident pump beam, and 5 denotes the definite polarization photon pair beam. Here, as for the beams emitted from elements 1 to 3, a horizontal polarization photon beam is represented as $a_i$ ( ), a vertical polarization photon beam is represented as $b_i$ ( ), where it is (i=1, 2, 3), and a source on an incident side is indicated in ( ).

When a pump beam 4 gets incident on the first definite polarization photon pair generating apparatus 1, most of the incident pump beam 4 is outputted by passing through the first definite polarization photon pair generating apparatus 1, the half-wave plate 3 and the second definite polarization photon pair generating apparatus 2, respectively. As it is an unnecessary output, it is masked by appropriate means not shown on the output side. When getting incident on the first definite polarization photon pair generating apparatus 1, the incident pump beam 4 generates the definite polarization photon pair beam 5 which comprises the horizontal polarization photon beam $a_1$ ($P_0$) and the vertical polarization photon beam $b_1$ ($P_0$). Next, the definite polarization photon pair beam 5 gets incident on the half-wave plate 3. The half-wave plate 3 rotates the plane of polarization of each incident photon beam by 90 degrees. Consequently, from the half-wave plate 3, a definite polarization photon pair beam 6 is generated which is rotated by 90 degrees and comprises a vertical polarization photon beam $b_2$ ($a_1$) and a horizontal polarization photon beam $a_2$ ($b_1$). The definite polarization photon pair beam 6 rotated by 90 degrees passes through the second definite polarization photon pair generating apparatus 2 so as to output the vertical polarization photon beam $b_2$ ($a_1$) and the horizontal polarization photon beam $a_2$ ($b_1$). The second definite polarization photon pair generating apparatus 2 also has the definite polarization photon pair beam which comprises a horizontal polarization photon beam $a_3$ ($P_0$) and a vertical polarization photon beam $b_3$ ($P_0$) generated by the incident pump beam 4. The two sets of the definite polarization photon pair beams having appeared on the output side of the second definite polarization photon pair generating apparatus 2 are superposed and generates an entangled photon pair beam 7 which comprises a vertical polarization photon beam #1 and a horizontal polarization photon beam #2. Here, the vertical polarization photon beam #1 includes the photons of the vertical polarization $b_2$ originating in the horizontal polarization $a_1$ and the vertical polarization $b_3$ originating in $P_0$, and the horizontal polarization photon beam #2 includes the photons of the horizontal polarization $a_2$ originating in the vertical polarization $b_1$ and the horizontal polarization $a_3$ originating in $P_0$ so as to obtain a quantum entangled state between the photon pairs.

A preferred embodiment of the present invention will be described in detail by using FIGS. 2 to 13.

[1] Basic Structure of the Entangled Photon Pair Generating Apparatus

Figure 2:
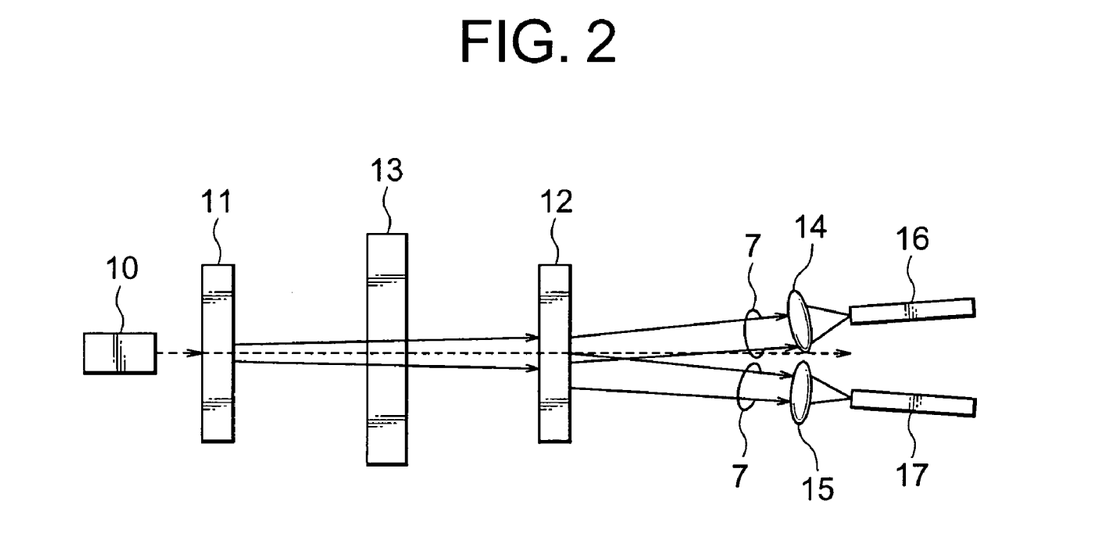
FIG. 2 is a basic block diagram of an embodiment of the present invention.

FIG. 2 is a basic block diagram of the entangled photon pair generating apparatus according to the embodiment of the present invention. This embodiment uses BBO (β-Ba $B_2 O_4$) of a nonlinear optical crystal on the definite polarization photon pair generating apparatus in FIG. 1.

In FIG. 2, reference numeral 10 denotes an incident pump beam source, 11 denotes a BBO 1, 12 denotes a BBO 2, 13 denotes a half-wave plate, 14 and 15 denote lenses for focusing beams, and 16 and 17 denote optical fibers. In the operation, when the pump beam from the incident pump beam source 10 gets incident on the BBO 1, the pump beam passes through the BBO 1, half-wave plate and BBO 2 as described in FIGS. 1A and 1B so that the definite polarization photon pair beams are generated on the BBO 1 and BBO 2 respectively. The definite polarization photon pair beam generated on the BBO 1 has its plane of polarization rotated by 90 degrees by the half-wave plate, and then passes through the BBO 2 to be superposed on another definite polarization photon pair beam generated on the BBO 2 so as to become the entangled photon pair beam. The two non-orthogonal polarization photon beams constituting the entangled photon pair beam are focused by the lenses 14 and 15, respectively, to be coupled to the optical fibers 16 and 17 so as to be taken out separately and used for arbitrary purposes.

In an actual example of manufacturing, thickness of the BBO 1 and BBO 2 is about 0.75 mm, and the thickness of the half-wave plate is about 1 mm, and a sandwich structure is used to make the BBO 1, half-wave plate and BBO 2 stick together without a gap among them. As a beam of 351.1 nm is used as the pump beam, the BBOs used are the ones which are cut so that the angle made by the pump beam getting almost vertically incident on the crystal surface and the optical axis of the crystal becomes 50.9 degrees.

In the actual example, there is a phenomenon that the polarization of the pump beam rotates in the half-wave plate unit. For this reason, the polarization of the pump beam is adjusted by the half-wave plate and quarter-wave plate in advance so that generation volumes of fluorescence pairs from the respective crystals of the BBO 1 and BBO 2 become almost equal. As a matter of course, it is possible, by applying this, to adjust weight of components of the entangled photon pair with the polarization of the pump beam.

The case of changing polarized light by 90 degrees by the half-wave plate has been described. It is also possible, however, to generate a more complicated entangled state by variously changing this angle.

[2] Principle of Generation of the Photon Pair having High Correlation Timewise

It is possible, when the photon pair to be generated simultaneously can be generated, to know when and where the photons exist by measuring one of them. As for the method of generating such a photon pair having high correlation timewise, a parametric fluorescence pair has been generally used so far.

The parametric fluorescence pair is the two photons $\omega_i$ and $\omega_s$ generated when the photon of energy $\omega_0$ gets incident into the nonlinear optical medium. Here, is a Planck's constant h=6.62×10$^{-34}$[j·s] divided by 2π, and $\omega_s$, $\omega_i$ and $\omega_0$ are frequencies of a signal photon beam, an idler photon beam (here, each of the photon pair is called so according to a custom) and the incident photon, respectively. In this case, the following relationship holds according to the energy conservation law.

$$\omega_0 = \omega_i + \omega_s \quad \text{Equation (1)}$$

The following also holds as a relationship equivalent to the law of conservation of momentum.

$$k_0 = k_i + k_s \quad \text{Equation (2)}$$

Here, $k_0$, $k_i$ and $k_s$ are the frequencies of the signal photon beam, idler photon beam and incident photon respectively. The conditions of the equations (1) and (2) are called phase matching conditions. To generate the parametric fluorescence, it is necessary to satisfy the phase matching conditions in the medium having sufficient nonlinear constants.

Figure 3:
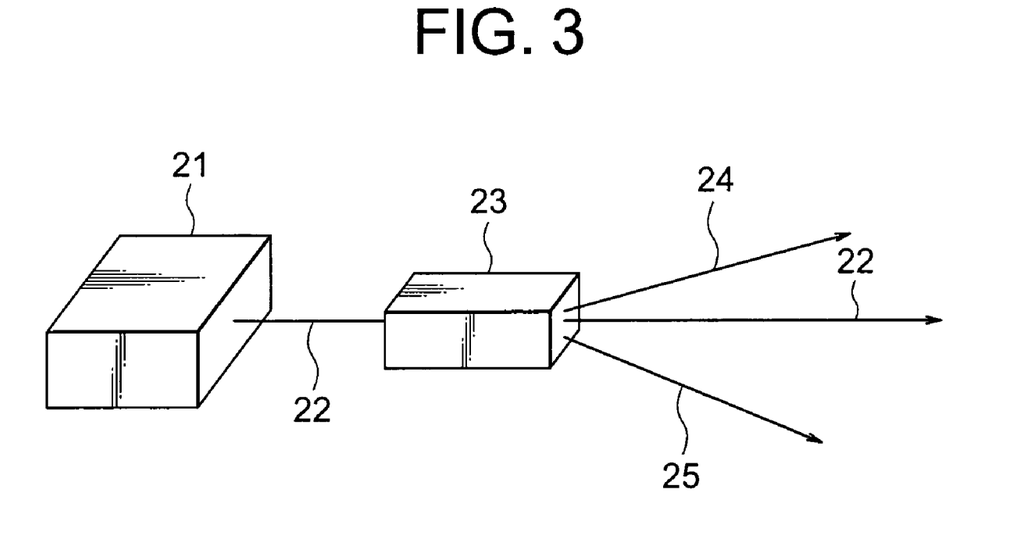
FIG. 3 is a diagram for explaining an embodiment 1 of a definite polarization photon pair generating apparatus.

[3] Embodiment 1 of the Definite Polarization Photon Pair Generating Apparatus and Collinear Conditions FIG. 3 is a diagram for explaining an embodiment 1 of the definite polarization photon pair generating apparatus according to the present invention. In FIG. 3, reference numeral 21 denotes an incident pump beam generating unit, 22 denotes an incident pump beam outputted from the incident pump beam generating unit 21, 23 denotes a nonlinear optical medium, 24 denotes a signal photon beam, and 25 denotes an idler photon beam.

Next, A principle of operation of the embodiment 1 will be described by using FIGS. 4 to 8. In the case where the nonlinear optical medium is a uniaxial crystal, there are a polarization direction in which a refractive index is different according to a transmission direction and a polarization direction in which the refractive index is not different according the transmission direction. The former is called extraordinary polarization and the latter is called ordinary polarization.

Figure 4:
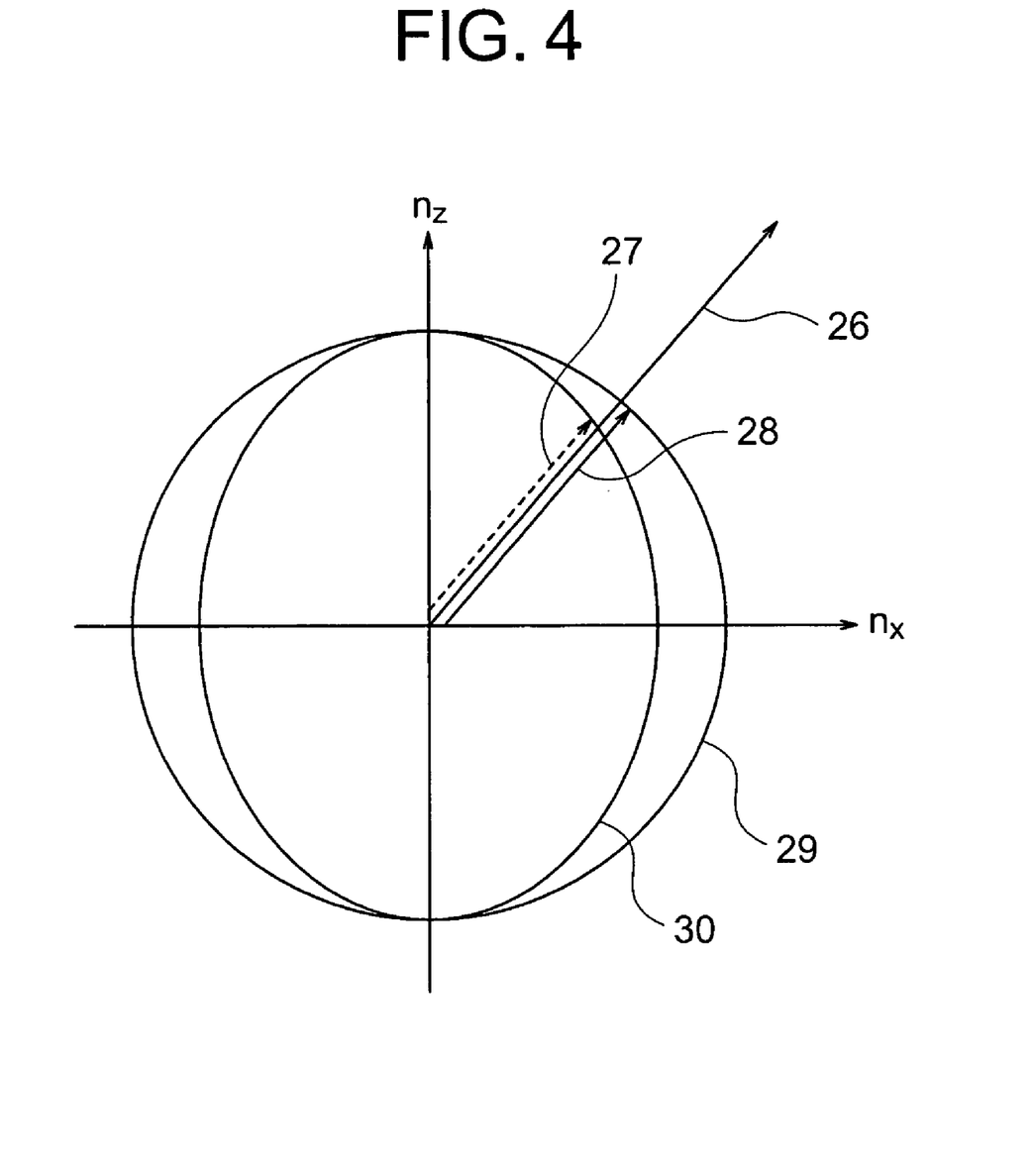
FIG. 4 is a diagram for explaining an index surface of a nonlinear optical medium.

FIG. 4 shows an index surface of the nonlinear optical medium 23 in FIG. 3. In FIG. 4, reference numeral 26 denotes a wavenumber vector of the incident pump beam, 27 denotes an extraordinary polarization wavenumber vector, 28 denotes an ordinary polarization wavenumber vector, 29 denotes an index surface of the ordinary polarization, and 30 denotes an index surface of the exraordinary polarization. Based from the phase matching condition given by the equation (2), when the sum of the extraordinary polarization wavenumber vector 27 and the ordinary polarization wavenumber vector 28 is equal to the wavenumber vector of the incident pump beam 26, the parametric fluorescence pair is generated. As in FIG. 4, the case where the phase matching condition is satisfied with the extraordinary polarization and the ordinary polarization in the same direction is called generation of a collinear fluorescence pair, and the angle made then by the optical axis and the incident pump beam is called a collinear condition angle. FIG. 4 shows the case where the energy of the fluorescence pair is half that of the incident pump beam respectively. In general, however, it does not need to be half in particular if the equations (1) and (2) are satisfied. The collinear condition has been generally used so far.

Figure 5:
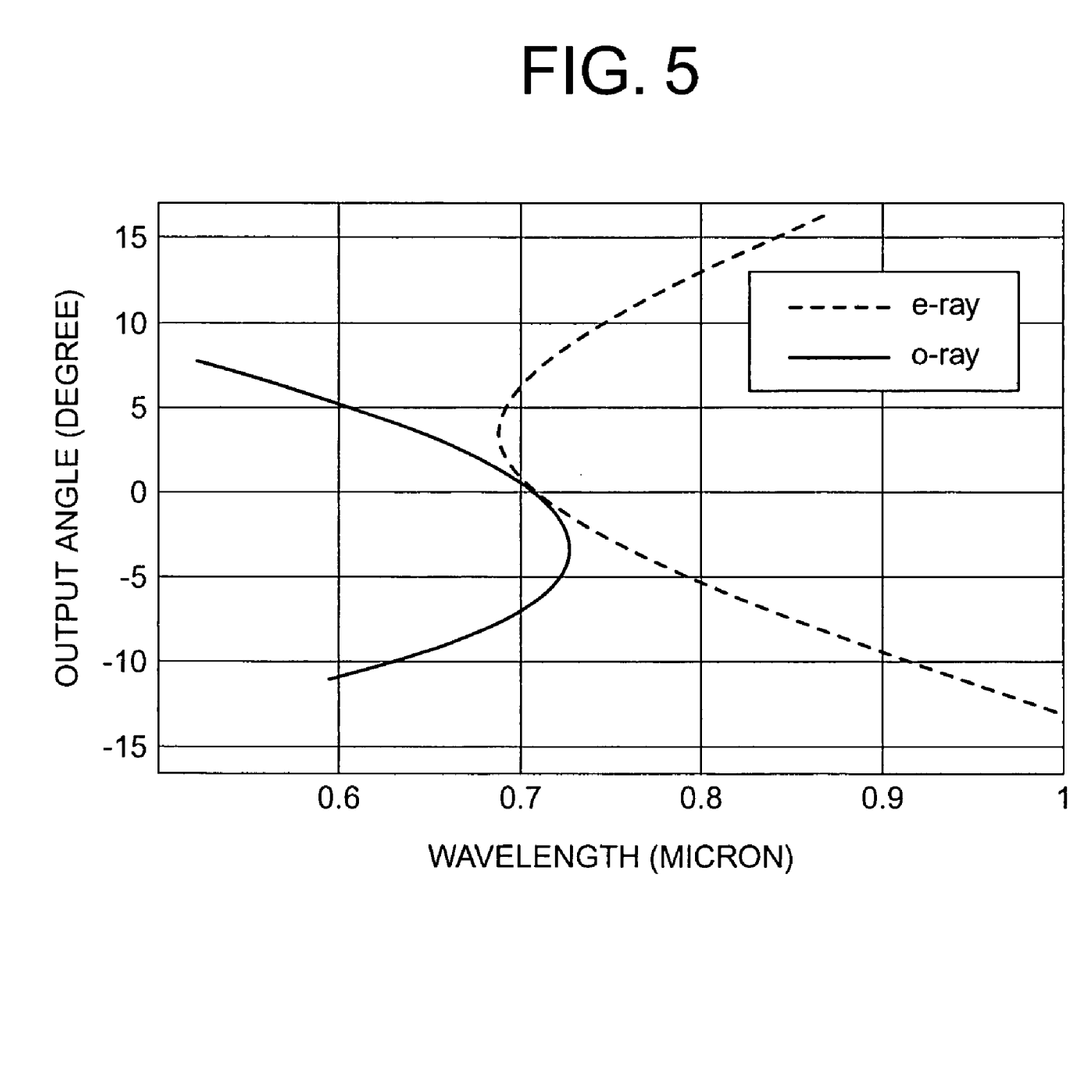
FIG. 5 is a diagram showing a relationship between a fluorescent output angle and a fluorescent wavelength on a collinear condition.
Figure 6:
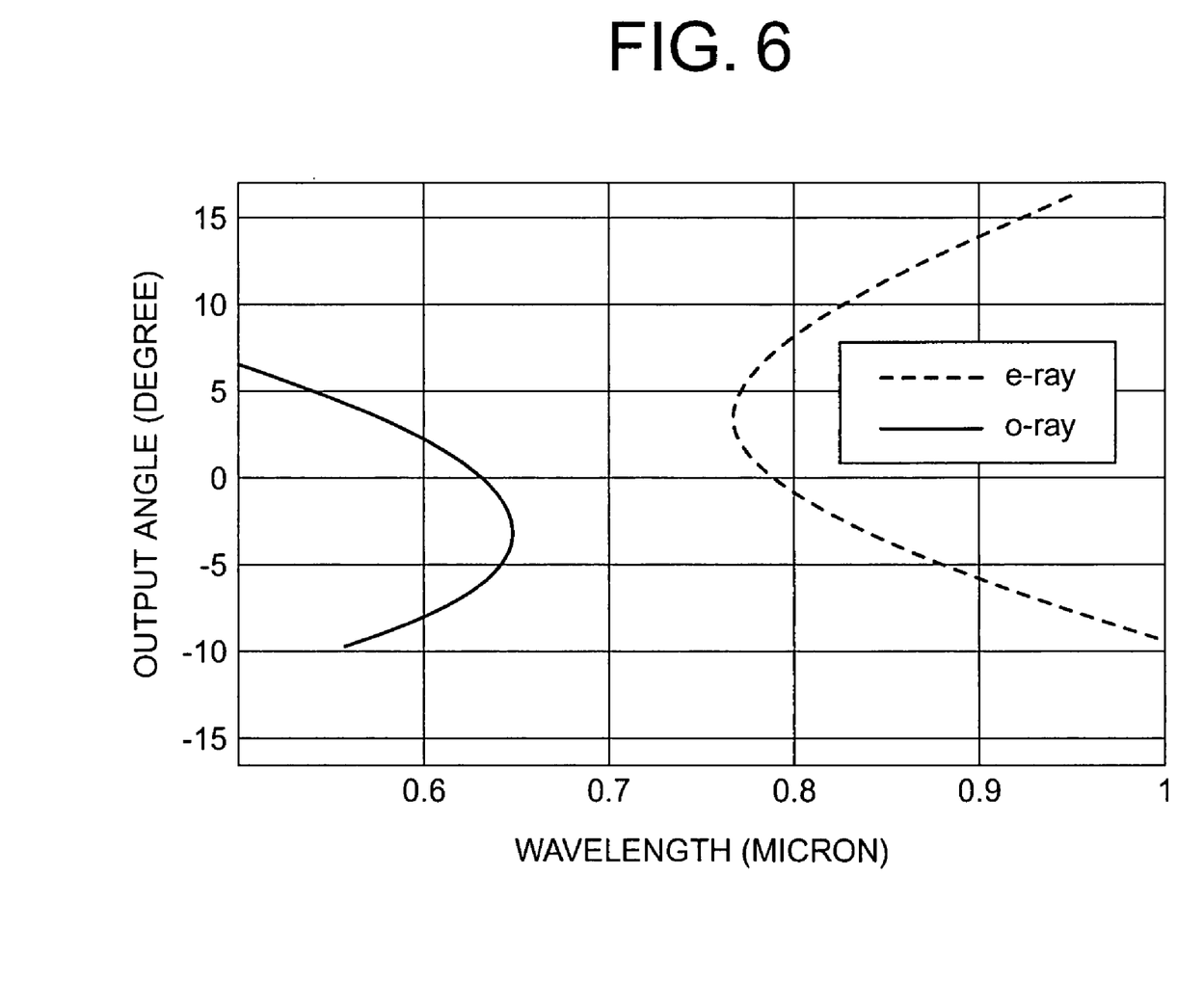
FIG. 6 is a diagram showing the relationship between the fluorescent output angle and the fluorescent wavelength in the case where an angle made by an optical axis of a crystal and incident pump beam is smaller than the collinear condition angle.
Figure 7:
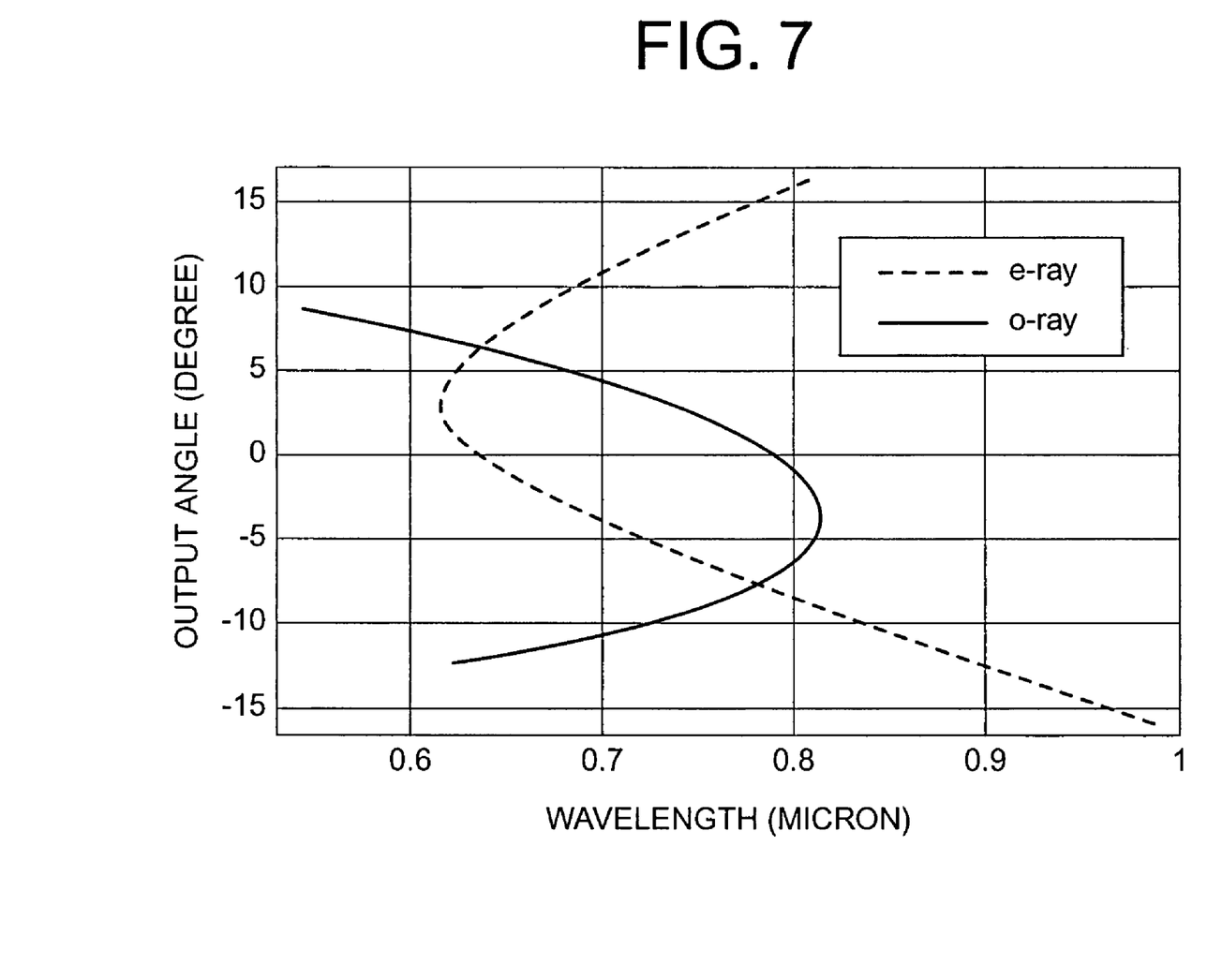
FIG. 7 is a diagram showing the relationship between the fluorescent output angle and the fluorescent wavelength in the case where the angle made by the optical axis of the crystal and the incident pump beam is larger than the collinear condition angle.
Figure 8:
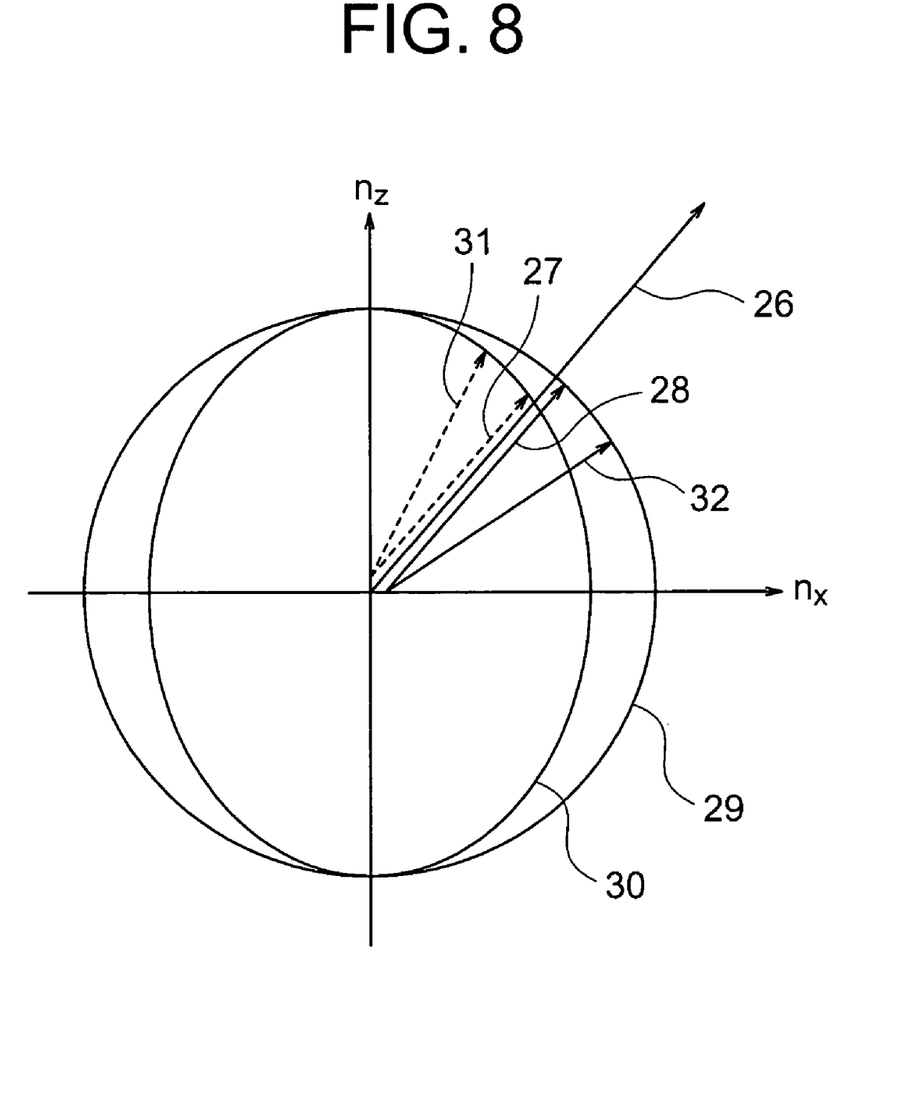
FIG. 8 is a diagram for explaining a set of extraordinary polarization and ordinary polarization satisfying the collinear condition.

FIGS. 5, 6 and 7 are the diagrams showing the relationship between a fluorescent output angle and a fluorescent wavelength in the case where the angle made by the optical axis of the crystal and the incident pump beam is under various conditions. These diagrams show the results of logical computation regarding parametric fluorescence generation by T. B. Pittman et al. listed as a reference #4. It is the computation in the case where a BBO crystal is used as the nonlinear optical medium 23 in FIG. 3 and the collinear condition angle is the angle made by the optical axis thereof and the incident pump beam 22 having a wavelength of 351.1 nm. A horizontal axis in each diagram indicates the wavelength (micrometer), and a vertical axis indicates the output angle (the angle made by a radiation direction of the parametric fluorescence pair in the crystal and the incident pump beam). A dotted line is a radiation curve of the extraordinary polarization, and a solid line is a radiation curve of the ordinary polarization. These curves are called tuning curves. The reference #4 is "T. B. Pittman et al., Two photon geometric optics, Phys Rev A Vol. 53 No. 4 (1996)."

FIG. 5 is the case of the collinear condition angle, where the curves in solid line and dotted line are in contact at the wavelength of 702.2 nm and the output angle of 0 degree.

Specifically, it indicates that fluorescence of the extraordinary polarization and ordinary polarization of the wavelength of 702.2 nm is emitted in the same direction as the incident pump beam. The curves show that, at this time, the extraordinary polarization of 702.2 nm is also radiated in an angular orientation of plus 6.5 degrees and the ordinary polarization of 702.2 nm is also radiated in an angular orientation of minus 6.5 degrees. As shown in the index surface in FIG. 8, this is because a pair of wavenumber vectors of the extraordinary polarization and ordinary polarization satisfying the phase matching condition equation (2) can satisfy the equation (2) not only with the wavenumber vectors 27 and 28 of the collinear fluorescence pair but also with a combination of an extraordinary polarization wavenumber vector 31 and an ordinary polarization wavenumber vector 32.

FIG. 6 shows an example of the case where the angle made by the optical axis and the incident pump beam is smaller than 49.2 degrees of the collinear condition (i.e., 45.8 degrees). In this case, it can be understood, based from the curves in the diagram, that only the extraordinary polarization of the wavelength longer than about 770 nm is radiated, and only the ordinary polarization of the wavelength shorter than about 650 nm is radiated as against it. For instance, the extraordinary polarization of the wavelength of 790 nm and the ordinary polarization of the wavelength of 630 nm are radiated in the same direction of 0 degree as the incident pump beam.

FIG. 7 shows an example of the case where the angle made by the optical axis and the incident pump beam is larger than 49.2 degrees of the collinear condition (i.e., 52.7 degrees). In this case, it can be understood, based from the curves in the diagram, for instance, that the photon of the extraordinary polarization of 702.2 nm is radiated in the directions of plus 11 degrees and minus 4 degrees and the photon of the ordinary polarization is radiated in the direction of plus 4 degrees and minus 11 degrees respectively.

Figure 9:
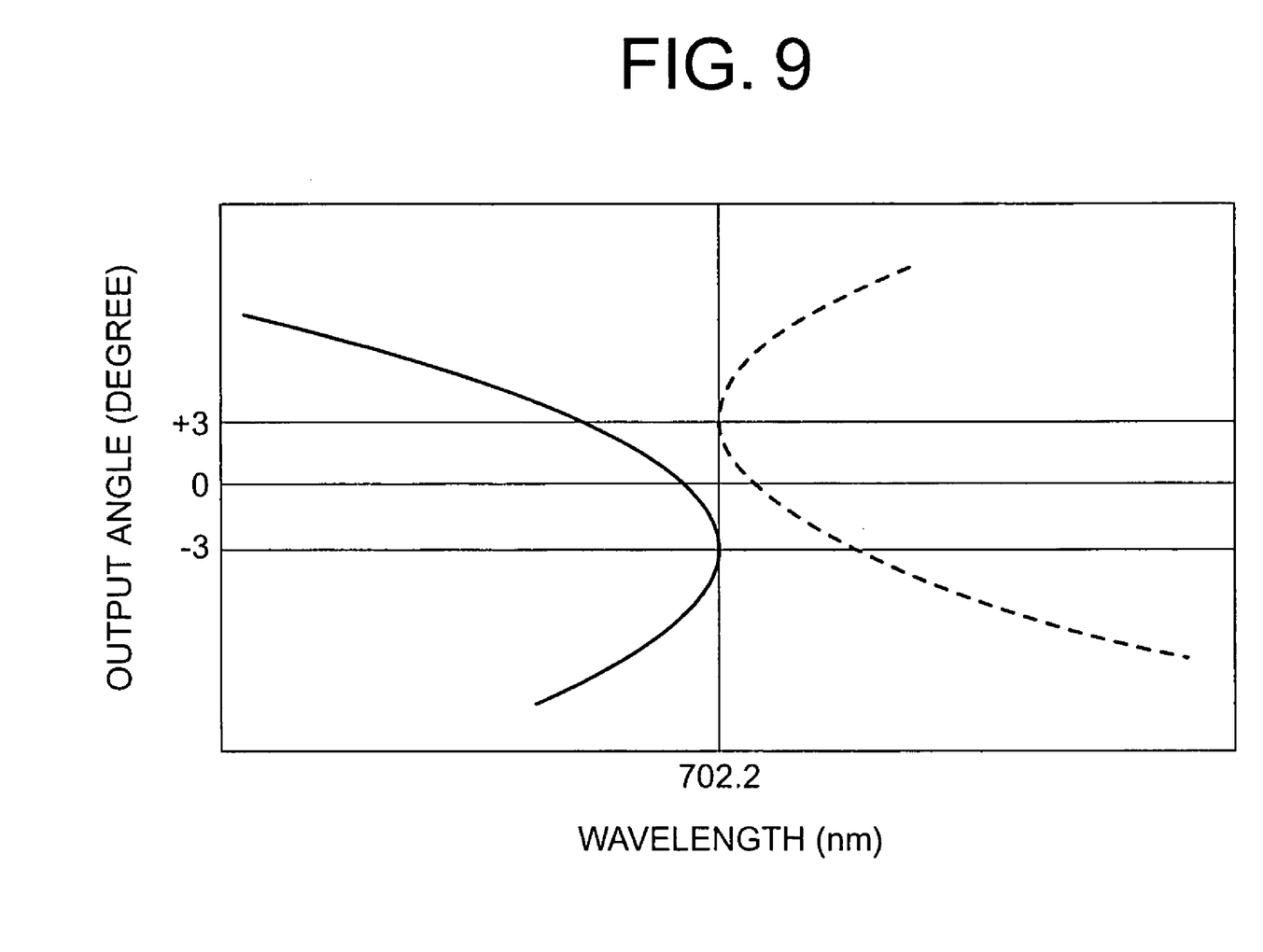
FIG. 9 is a diagram showing an example of the relationship between the fluorescent output angle and the fluorescent wavelength according to the embodiment of the present invention.

Thus, the output angles of the extraordinary polarization and the ordinary polarization change variously according to the incident angle. Conventionally, only a part of the parametric fluorescence radiated over a large angle was used under the collinear condition. Therefore, it was difficult to convert it to the beam of a circular or elliptic section or to cut the photons in mutually correlated directions. Thus, I paid attention to the case where the tuning curves of the extraordinary polarization and the ordinary polarization contact a straight line of the wavelength of 702.2 nm. This case is shown in FIG. 9. In this case, the components of 702.2 nm of the parametric fluorescence are emitted only in the directions of minus 3 degrees of the ordinary polarization and plus 3 degrees of the extraordinary polarization.

Figure 10:
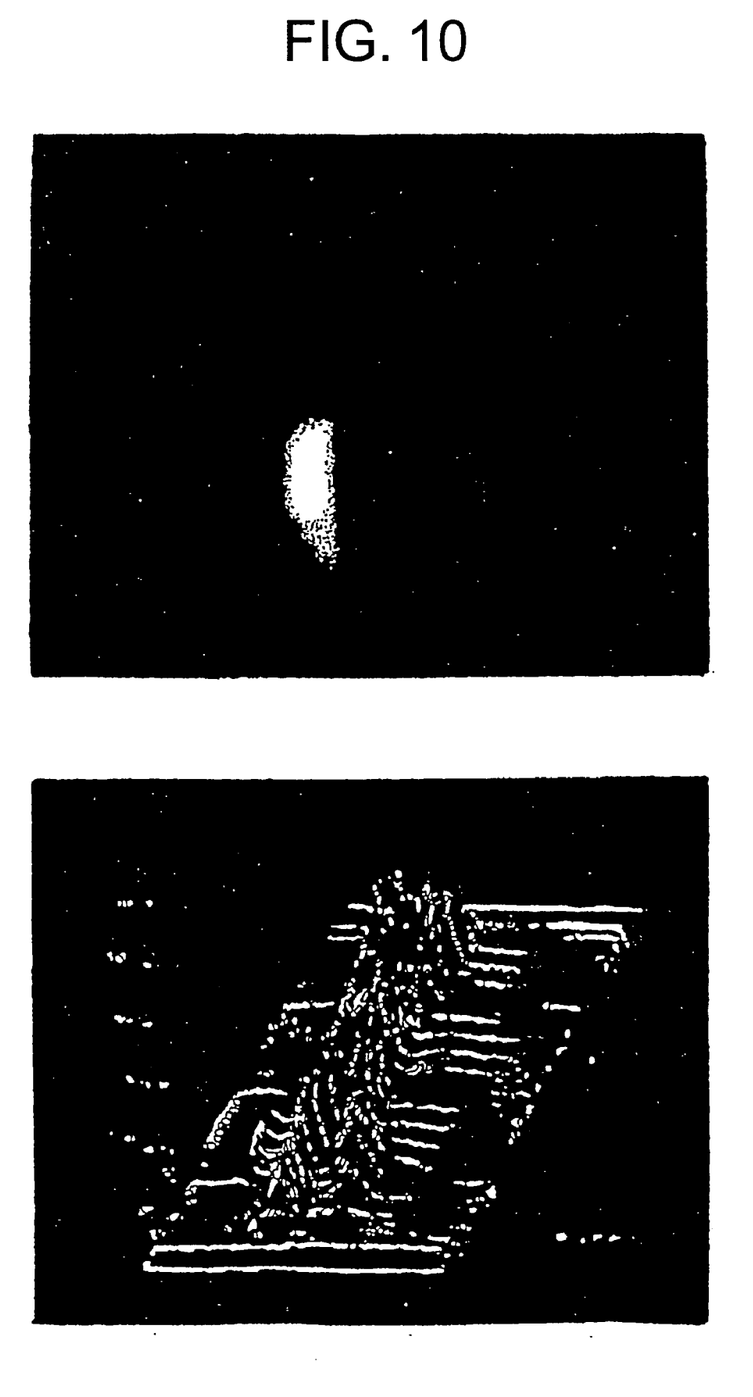
FIG. 10 are diagrams showing photos of parametric fluorescence viewed from an optical axis direction of the incident pump beam on the collinear condition.
Figure 11:
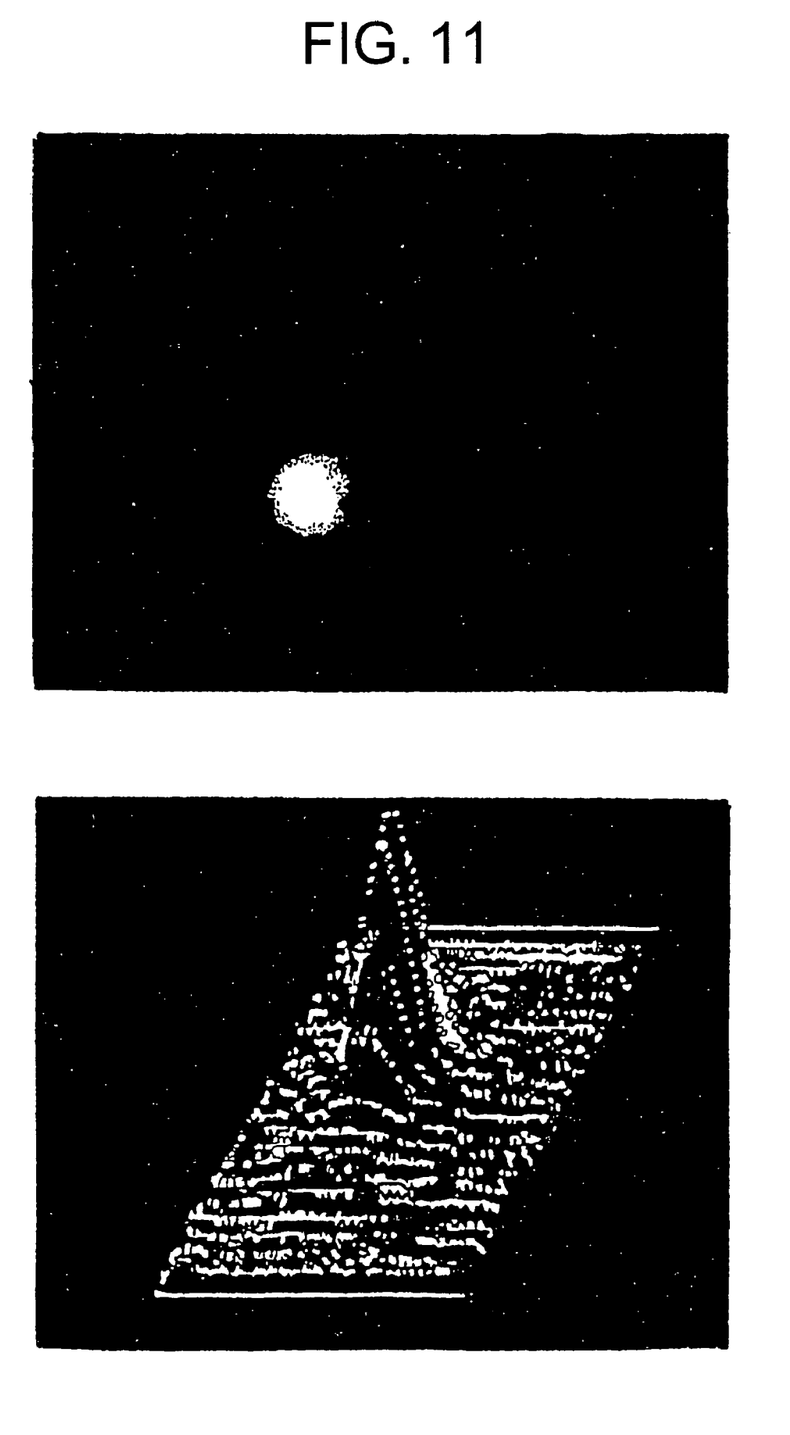
FIG. 11 are diagrams showing photos of the parametric fluorescence generated by the present invention.

FIGS. 10 and 11 show the experimental results. FIG. 10 is the photos of the parametric fluorescence radiated in the same direction as the incident pump beam which are taken by using a cooling CCD camera through a filter for passing only the beam of 702.2 nm, in the case where the angle made by the optical axis and the incident pump beam is 49.2 degrees of the collinear condition angle. The range shot in these photos is equivalent to about ±1.5 degrees of the output angle. Two circular arcs are in contact at one point, and the contacting direction is the direction of the incident pump beam. Thus, it can be understood that the parametric fluorescence is extensively radiated.

FIG. 11 is the photos of the parametric fluorescence in the case where the angle made by the optical axis and the incident pump beam is 50.9 degrees. From this image, it can be understood that it is actually radiated at the output angle of 0.8 degrees or less. And, the light volume obtained in this state is $1.8 \times 10^6$ CPS when the incident pump beam of 0.1 W per beam got incident, assuming that there is no absorption by optical components on the way, which is.

Thus, it is possible, by adjusting the angle of the crystal at a specific angle against the incident pump beam, to obtain a fluorescence beam status of which divergence angle is small.

According to this embodiment, an argon laser for oscillating at 351.1 nm is used as a light source of the incident pump beam generating unit. However, it is possible, as a matter of course, to use a different wavelength and another laser light source.

The BBO crystal is used as the nonlinear optical medium. However, it is possible, as a matter of course, to use other materials such as KDP or organic nonlinear optical materials. Here, the uniaxial crystal is taken as an example. However, a general biaxial crystal can also be used as the nonlinear optical medium likewise.

[4] Embodiment 2 of the Definite Polarization Photon Pair Generating Apparatus

According to the embodiment 1, attention was paid to the case where both the tuning curves of the extraordinary polarization and the ordinary polarization contact the straight line of the wavelength of 702.2 nm. However, it is possible, as a matter of course, to use the case of having vertexes at different wavelengths.

For instance, in the case of using the tuning curves on which the extraordinary polarization has the vertex at the wavelength of 710 nm and the ordinary polarization has the vertex at the wavelength of 694.5 nm, the beams of the respective wavelengths are radiated as single photon beams.

[5] Embodiment of the Entangled Photon Pair Generating Apparatus

Figure 12:
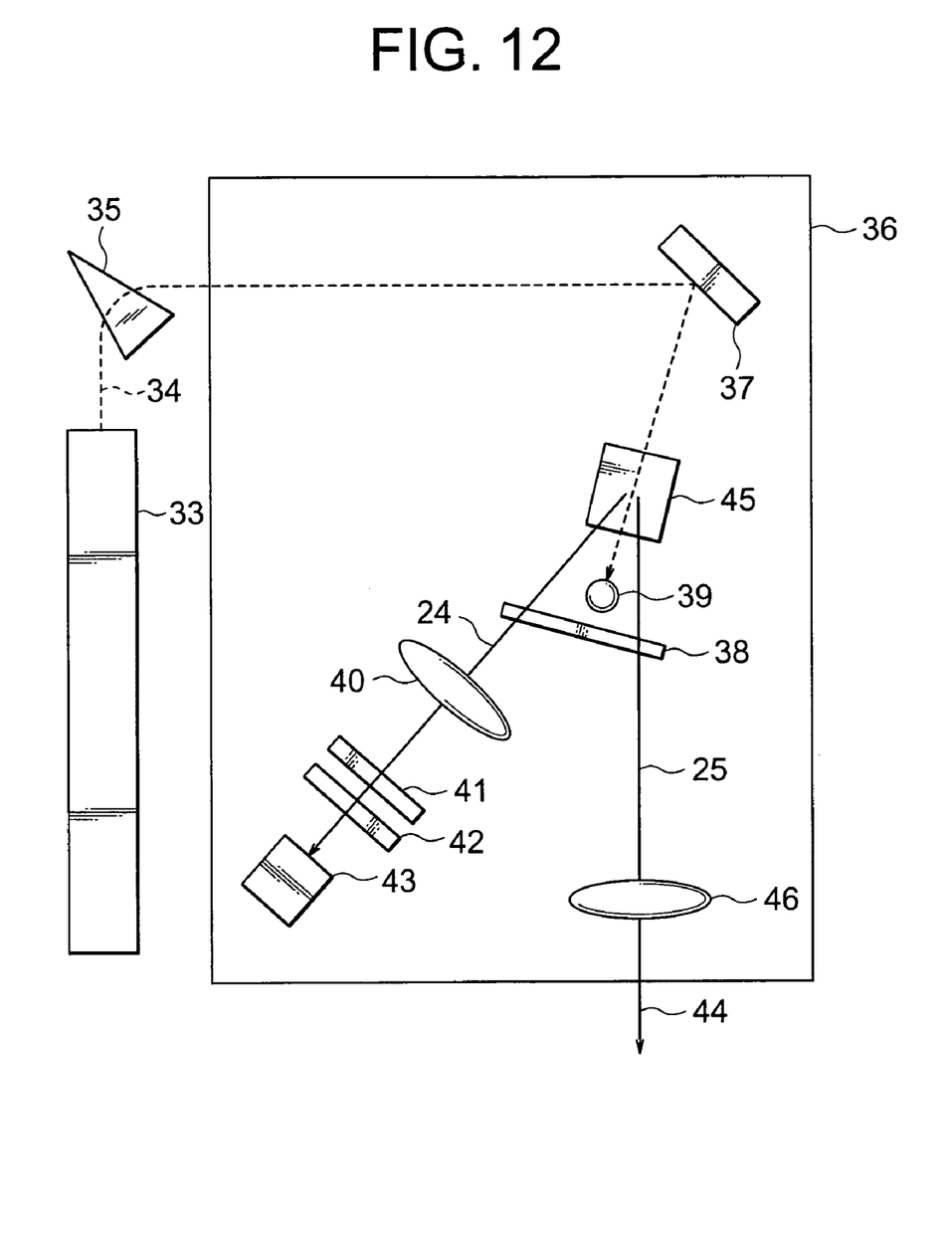
FIG. 12 is an overall structure diagram of an embodiment of an entangled photon pair generating apparatus according to the present invention.

FIG. 12 shows an embodiment of the entangled photon pair generating apparatus according to the present invention. In FIG. 12, reference numeral 33 denotes an argon laser, 34 denotes an incident pump beam, 35 denotes a dispersing prism, 36 denotes a dark box (or dark chamber), 37 denotes a mirror, 38 denotes a dichroic mirror, 39 denotes a beam-stopper (or absorber), 40 denotes a lens, 41 denotes a short wavelength beam cut filter, 42 denotes a sheet polarizer, 43 denotes a detector, 44 denotes a single photon beam, 45 denotes a photon pair generating unit which comprises the BBO 1, half-wave plate and BBO 2 in FIG. 2, and 46 denotes a lens. According to the embodiment, it is possible, by observing one of the entangled photon pair, to easily and arbitrarily change or randomize the polarization state of the other photon and determine the generation time.

According to the embodiment, the argon laser 33 operates at a single frequency, and generates the incident pump beam 34 (351.1 nm) for generating the parametric fluorescence. After removing a noise beam generated in the laser with the dispersing prism 35, the incident pump beam 34 gets incident on the dark box 36. The dark box 36 has holes for incidence of the pump beam and emitting the generated single photon beam 44. As the parametric fluorescence is generally weak, a system is constructed in the dark box 36 so that light from outside will not enter as noise into the detector 43. The incident pump beam 34 is bent at an appropriate angle by the mirror 37. This angle decides an emission direction of the single photon beam 44. The bent incident pump beam 34 gets incident on the photon pair generating unit 45. The photon pair generating unit 45 is cut in advance so that the optical axis faces the angle suitable to generate the parametric fluorescence on vertical incidence of the incident pump beam. Errors due to cutting, temperature conditions and so on are corrected by an angle fine-adjusting apparatus mounted on the photon pair generating unit 45. The incident pump beam 34 passes through the photon pair generating unit 45, and then is absorbed by the beam stopper 39. Of the photon pairs generated in the crystal, the signal photon beam 24 is collected by the lens 40 and then gets incident on the detector 43 though the short wavelength beam cut filter 41 and the sheet polarizer 42 for eliminating background noise beam in the dark box. A photomultiplier tube capable of photon counting may be used as the detector 43. The idler photon beam 25 becomes a parallel beam through the lens 46 and is emitted to the outside of the dark box as the single photon beam 44.

As for the sheet polarizer 42, it is possible to use a unit combining the half-wave plate, quarter-wave plate and polarization beam splitter as a superior structure. As previously described, the signal photon 24 and the idler photon 25 are in the entangled relationship. Therefore, when the signal photon is detected as the one having specific polarization according to the sheet polarizer 42, the idler photon beam 25 is outputted then as a single photon having the specific polarization according to the kind of entangled state and the state of the sheet polarizer 42. For instance, consideration is given to the case where, as the entangled state, the following entanglement is generated when |H>i is an idler photon having horizontal polarization and |V>s is a signal photon having vertical polarization.

$$|\phi>=|H>i|V>s-|V>i|H>s$$

In this case, it is possible to arbitrarily change the single photon having the specific polarization to the signal photon having the vertical polarization by setting the sheet polarizer 42 to pass only the horizontal polarization, or to the signal photon having the polarization vertical to the sheet polarizer 42 for passing skew polarization by setting the sheet polarizer 42 so.

To have the photon beam efficiently incident on the optical fiber, the beam does not pass in the optical fiber unless the beam gets incident on an optical fiber end face at an angle smaller than an angle α decided by the following equation in which the refractive index of an optical fiber (core) material is "n" when the number of openings unique to the optical fiber is "NA".

$$NA = n \sin(\alpha/2) \qquad \text{Equation (3)}$$

According to the conventional method, however, the parametric fluorescence is radiated in a wide angle range. Therefore, a fluorescence image at the position of a condenser lens becomes larger, consequently requiring a long distance from the lens to the optical fiber end face.

According to the present invention, however, it is possible to generate the fluorescence at a small angle as the signal photon beam 24 or the idler photon beam 25. Consequently, the fluorescence image at the position of the condenser lens becomes smaller, and so it is possible to reduce the distance from the lens to the optical fiber end face so as to miniaturize the apparatus.

Figure 13:
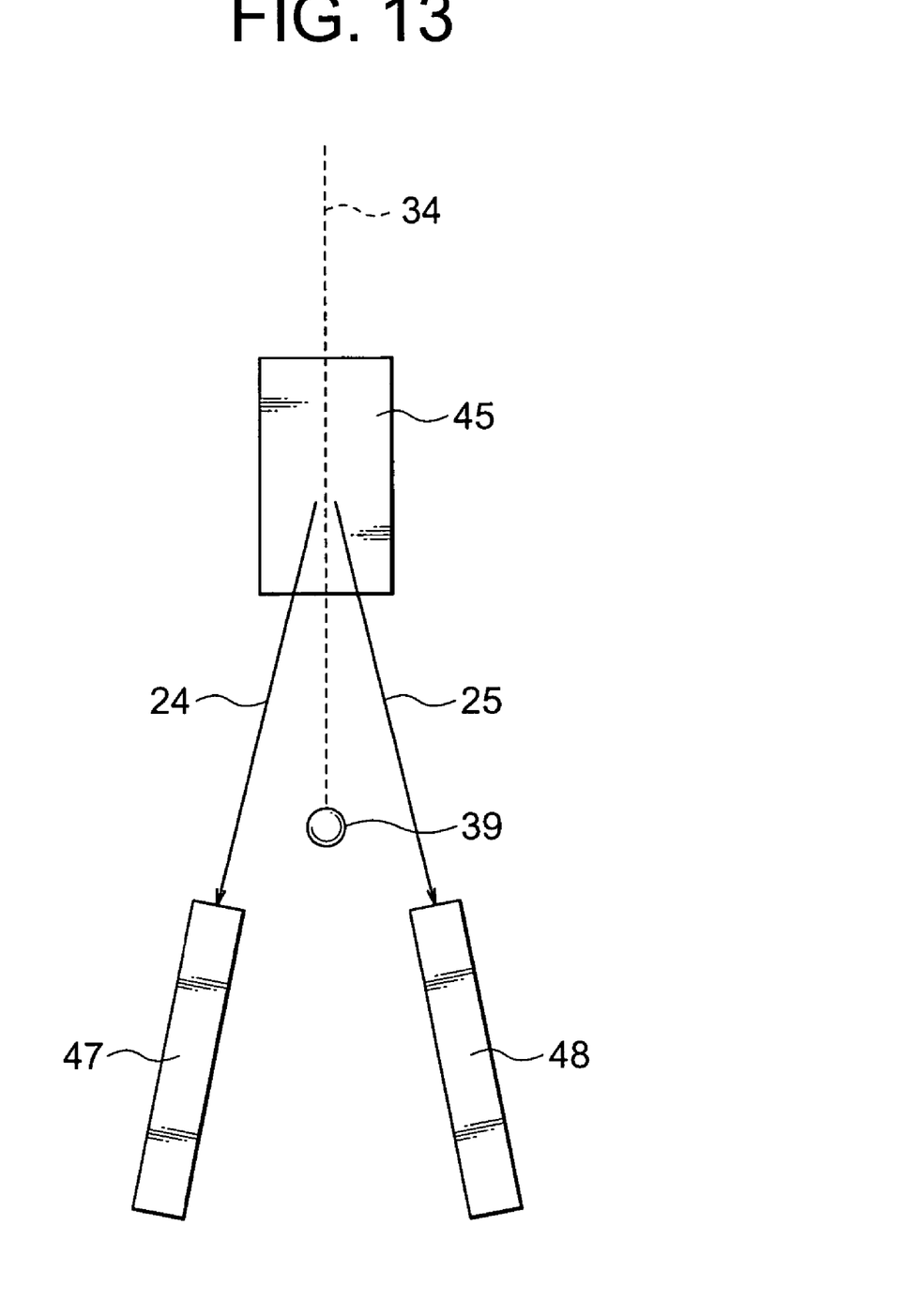
FIG. 13 is a diagram showing an overall structure diagram of another embodiment of the entangled photon pair generating apparatus according to the present invention.

As a further example, as shown in FIG. 13, it is possible to omit the condenser lens and to have the signal photon 24 and the idler photon 25 directly incident on optical fibers 47 and 48. It was very difficult, according to the conventional method, to efficiently have the signal photon beam and the idler photon beam directly incident on the optical fibers, because the expanse of the beam radiated from the nonlinear optical medium is large and when the optical fiber end face gets too close to the nonlinear optical medium, the incident pump beam also gets incident on the optical fibers to increase the noise.

According to the present invention, however, it is possible to generate the fluorescence as the signal photon beam or the idler photon beam at the small angle. Therefore, it is feasible to get directly incident on the optical fiber without the lens in the case where the optical fiber has an appropriate core diameter. Thus, it became possible to miniaturize the apparatus and save trouble required for optical system adjustment. Furthermore, it is possible, as a matter of course, to couple the optical fiber end face and the nonlinear optical medium in contact.

As a further embodiment, it is possible to collect one of the signal photon beam and the idler photon beam by using the lens and have it incident on the optical fibers while having the other directly incident on the optical fibers. For instance, in the case where the idler photon beam is detected to obtain the single photon beam of a determined generation time, the idler photon beam is merely detected and may have a short transfer distance. Therefore, a multimode fiber capable of a large diameter is used as the optical fiber to have the beam directly incident. And a single mode fiber capable of long distance transmission is used as the optical fiber for the signal photon beam necessary to be transmitted a long distance as the single photon beam so as to get incident on the optical fiber by using the lens because of its small fiber core diameter. These are the concrete examples.

INDUSTRIAL APPLICABILITY

As described above, according to the present invention, the two definite polarization photon pair generating apparatuses (nonlinear optical devices) constituted to generate the "definite polarization photon pair beam" are placed in series, and have the pump light incident by sandwiching the wave plate for rotating the polarization by 90 degrees between them. It is thereby possible to superpose the photon beams of the horizontal polarization and vertical polarization, that is, mutually different polarization, generated by the two definite polarization photon pair generating apparatuses respectively so as to generate the entangled photon pair beam more efficiently than conventional method.

Consequently, my experiments showed the result of increasing to 80 percent or more the probability of finding another photon in the other beam in the case where one photon is discovered in one beam, which had been reported as several percent at the most according to various experiments till then.

Furthermore, the generated photon pair beams are focused on two very small spots of 0.9 degrees or less having a small angle expanse which is easily converted to the beam of the circular or elliptic section, and so the coupling efficiency with the optical fibers is conspicuously improved.

The invention claimed is:

1. An entangled photon pair generating apparatus comprising:
    a first definite polarization photon pair generating apparatus to generate a first definite polarization photon pair beam according to an incident pump beam;
    a wave plate to rotate by 90 degrees a plane of polarization of the first definite polarization photon pair beam emitted from the first definite polarization photon pair generating apparatus; and
    a second definite polarization photon pair generating apparatus to generate a second definite polarization photon pair beam according to the incident pump beam, wherein the first definite polarization photon pair generating apparatus, wave plate and second definite polarization photon pair generating apparatus are adjacently placed in the order along an optical axis of the incident pump beam.

2. The entangled photon pair generating apparatus according to claim 1, wherein the first and second definite polarization photon pair generating apparatuses are nonlinear optical devices.

3. The entangled photon pair generating apparatus according to claim 2, wherein an incident angle of the incident pump beam on the nonlinear optical devices is an angle at which the angle made by the optical axis of a crystal in the nonlinear optical device and the incident pump beam satisfies a collinear condition.

4. The entangled photon pair generating apparatus according to claim 2, wherein the nonlinear optical device is a BBO ($\beta$-Ba B$_2$ O$_4$) crystal.

5. The entangled photon pair generating apparatus according to claim 1, further comprising:
   a lens to focus each of entangled photon pair beams; and
   an optical fiber to couple the focused beams.

6. The entangled photon pair generating apparatus according to claim 1, wherein the first and second definite polarization photon pair generating apparatuses further comprise:
   an incident pump beam generating unit; and
   a photon pair generating unit comprising the nonlinear optical device having the angle made by the optical axis of the crystal and the incident pump beam set up at the angle for a tuning curve thereof to contact with a specific single wavelength a,
   wherein two photon beams are generated which include a pair of photons of the wavelength a which are generated simultaneously.

7. The entangled photon pair generating apparatus according to claim 1, wherein the first and second definite polarization photon pair generating apparatuses further comprise:
   the incident pump beam generating unit; and
   the photon pair generating unit comprising the nonlinear optical device having the angle made by the optical axis of the crystal and the incident pump beam set up at the angle for the tuning curve thereof to contact with wavelengths a and b, respectively,
   wherein the two photon beams are generated which are include a pair of photons of the wavelengths a and b which are generated simultaneously.

8. The entangled photon pair generating apparatus according to claim 1, further comprising:
   a detecting unit for detecting one of the generated photon pair,
   wherein the detecting unit is able to identify generation time of each individual photon included in the beam.

9. The entangled photon pair generating apparatus according to claim 3, wherein the nonlinear optical device is a BBO ($\beta$-Ba B$_2$ O$_4$) crystal.

10. The entangled photon pair generating apparatus according to claim 2, further comprising:
    a lens to focus each of entangled photon pair beams; and
    an optical fiber to couple the focused beams.

11. The entangled photon pair generating apparatus according to claim 3, further comprising:
    a lens to focus each of entangled photon pair beams; and
    an optical fiber to couple the focused beams.

12. The entangled photon pair generating apparatus according to claim 4, further comprising:
    a lens to focus each of entangled photon pair beams; and
    an optical fiber to couple the focused beams.

13. The entangled photon pair generating apparatus according to claim 2, further comprising:
    a detecting unit for detecting one of the generated photon pair,
    wherein the detecting unit is able to identify generation time of each individual photon included in the beam.

* * * * *